Inventor:
GHEORGHE BERCARU
by Arthur O. Klein
his Attorney

Inventor:
GHEORGHE BERCARU

Inventor:
GEORGHE BERCARU

United States Patent Office 3,303,898
Patented Feb. 14, 1967

3,303,898
BEARING SEALING AND LUBRICATING DEVICE
Gheorghe Bercaru, Bucharest, Rumania, assignor to Ministerul Petrolului, a firm
Filed Oct. 28, 1963, Ser. No. 319,435
Claims priority, application Rumania, Nov. 9, 1962, 45,809
5 Claims. (Cl. 175—228)

This invention relates to a bearing sealing and lubricating device for both conventional steel-toothed bits and carbide bits.

The lubricant is supplied by means of a resilient mechanism mounted in a cylindrical chamber provided in each of the bit legs.

The main object of the invention is to provide a bearing lubricant seal between two relatively rotating surfaces of the cutter and its pin. For this purpose an especially designed annular seal is so placed that it will prevent at all times the entrance of a contaminant to the bearings.

Bearing lubricant seals are known to be used for rock bits to avoid penetration of foreign material, against the erosive and corrosive action of the drilling fluid as well as for the bearing to work in a lubricating medium.

In most cases, the space between cutter and pin is sealed by means of an annular seal of various cross-sections. Sometimes the so-called "O ring" is used.

In other cases the sealing ring is shaped like a truncated cone, the sealing faces being at the ends of the opposite areas of the seal. It is fitted with a metal core coated with a flexible material.

The permanent lubrication of the bit bearings is made possible by means of cylindrical chambers provided in each of the bit legs supplying the lubricant to the bearings through connecting passages. The communication between this chamber and the drilling mud in the bore-hole is accomplished through a bore either in the upper part of the leg shoulder or on the inner side of the bit beneath the bit nozzles.

The drilling mud is prevented from mixing with the lubricant in the chamber either by means of an elastic diaphragm or a closely fitting piston which can easily move in either direction in the cylindrical chamber.

The elastic diaphragm or the moving piston must assume the pressure variations in the drilling fluid surrounding the bit and transmit them to the lubricant inside the cutter to equalize these pressures. However, as in this case the lubricant is introduced into the bit body under no initial pressure and the lubricant pressure inside the cutter is created during the drilling operations by the mud pressure in the bore-hole after flowing across the nozzles, the lubricant pressure tends to follow closely the mud pressure, which enables the progressive entrance of the mud to the cutter; frequently during the drilling operations the instantaneous drilling mud pressure happens to exceed the lubricant pressure because of the sluggishness of the elements of the device and the friction of its moving parts, so that the mud enters gradually past the sealing ring into the cutter.

This phenomenon is increased as the bit is subjected to impact loads while drilling through formations of varying hardness, the impact being also transmitted in the form of fluid overpressure to the sealing rings, increasing its wear and permitting the drilling fluid to enter the bearings.

A further disadvantage of these lubricating systems based on pressure equalization of the outside fluid and the lubricant inside the cutter, is the fact that sometimes the passages connecting the bore-hole and the diaphragm or moving piston, are plugged by cuttings, which may occur when their open ends are in the region where the drilling mud is heavily loaded with rock fragments.

Thus, sufficiently high pressure differences occur and the annular rings are subjected to external pressure exceeding the internal pressures, permitting the mud to enter the cutter especially as the drilling depth increases, because the drilling mud pressure increases proportionally to depth and the lubricant pressure remains at the value it had when the connecting passages got plugged.

The device according to the invention eliminates these disadvantages in that the lubricant inside the cutters is introduced as soon as the bit is assembled in the workshop, under a certain initial pressure which is maintained by means of a spring acting upon a piston mounted inside the cylindrical lubricant chamber, to which the mud lubricant pressure in the pipe string is added, prior to the mud flowing across the nozzles. Drilling mud access to the upper part of the piston in the cylindrical chamber is achieved across a channel provided inside the bit leg at a distance above the nozzle. Thus, the lubricant pressure exceeds throughout the drilling operations the pressure on the outside of the bit and in the annulus between the drill-string and bore-hole. In order to prevent cuttings and abrasive materials contained in the drilling fluid from plugging the connecting passages and the cylindrical lubricant chamber comprising the spring and the pressure equalizing piston, a sufficiently fine sieve is provided at the contact end of the passage or a very flexible membrane is mounted in this passage above the piston. In this case the passage and the space above the piston in the cylindrical chamber is filled with a liquid such as for instance glycerine.

To seal the space between the cutter and pin against the external medium, while a higher pressure exists inside the cutter, an annular seal of U-cross section, is used which is made of special rubber reinforced with suitable resilient materials. An alternate type of annular seal may have a metal wall.

The two annular walls of the seal rest entirely on the surface of the contact elements, i.e., the cutter and pin surfaces, sealing at all times the metal faces of these elements. Thus, a good seal is obtained, the lubricant pressure being always higher than the outer pressure, even as the clearance between cutter and pin is increased due to the wear of these parts as well as of the annular seal after a long working time.

An example of an application of this invention is given in the following, in conjunction with the drawings which indicate the following:

Figure 7:
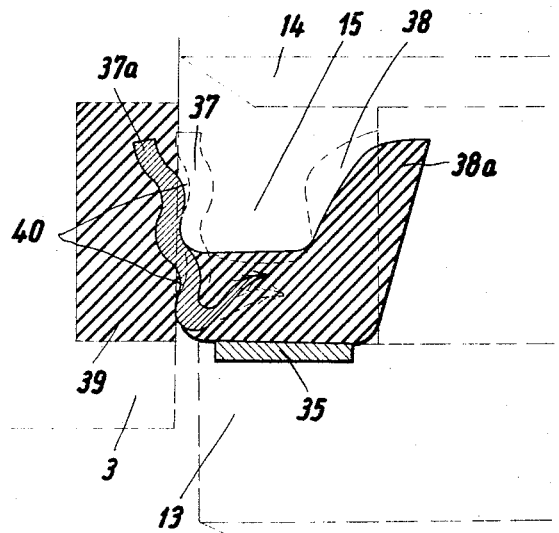

FIG. 7 is a cross-section through a composite U-shaped annular seal, having a metal corrugated wall, in the form of "bellows," and the other wall of rubber. The metal wall contacts a vulcanized rubber ring placed inside the cutter. The contour of the rubber ring in place is shown by a dotted line.

Figure 8:
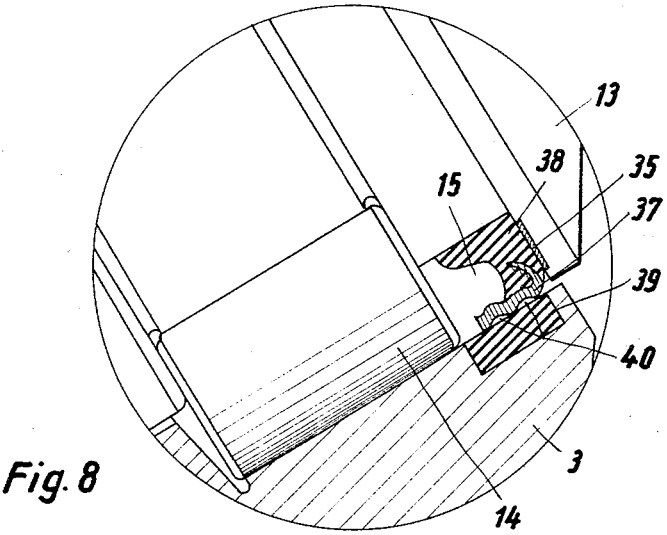

FIG. 8 is a position of a composite U-shaped annular seal, in the form of "bellows," placed between cutter and pin.

Figure 9:
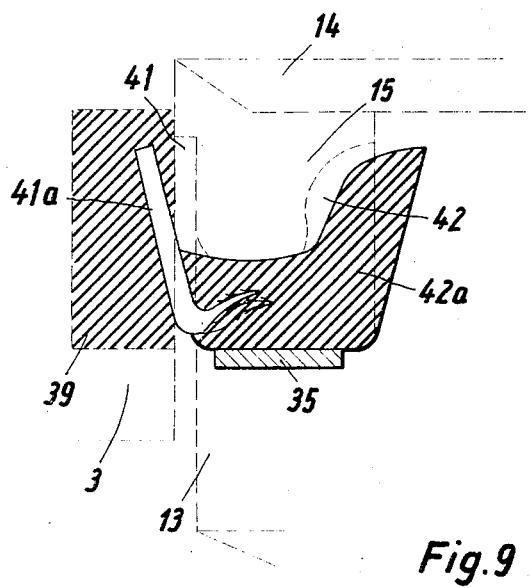

FIG. 9 is a cross-section through a composite U-shaped annular seal having a plane metal wall and the second wall of rubber. The metal wall contacts a vulcanized rubber ring placed inside the cutter. The contour of the plane rubber ring when in place is shown by the dotted line.

Figure 10:
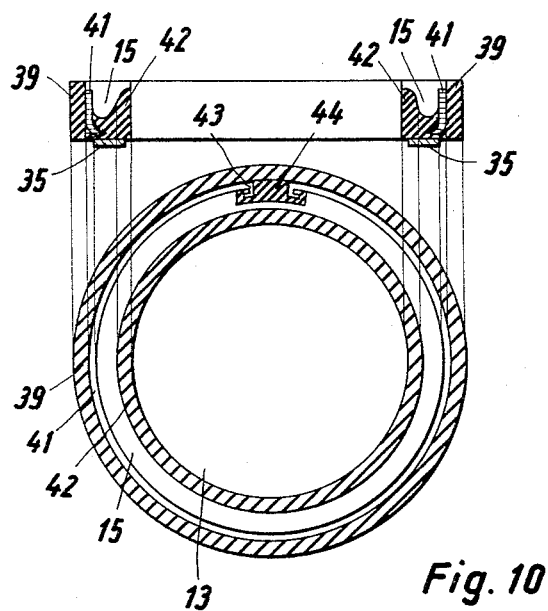

FIG. 10 is a circular section of a composite annular seal showing the metal wall whose circumference is discontinued and a piece of rubber is vulcanized between the two ends so that the annular wall is resilient and can change its diameter.

Figure 11:
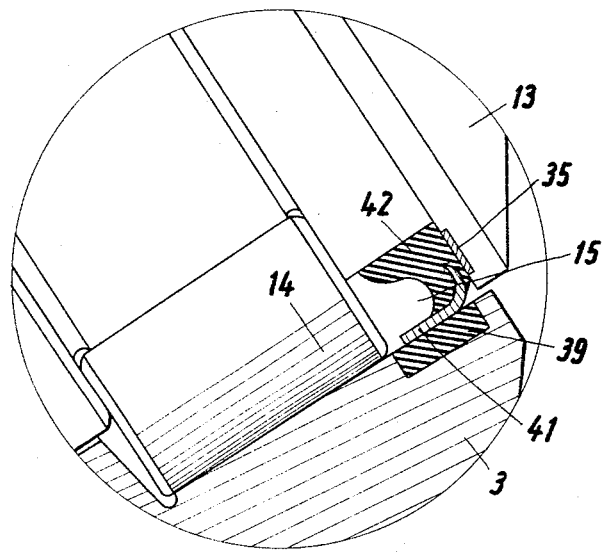

FIG. 11 is an example of positioning the composite U-type annular seal, having an outside plane metal wall and an inside rubber wall, between the two surfaces of cutter and pin.

According to the invention, in the shoulder of leg 1 a cylindrical chamber 2 is provided, slightly sloping toward the vertical axis of the bit. The diameter of the chamber should be chosen as large as possible, without affecting however the resistence of the leg. This chamber contains the lubricant and the resilient mechanism transmitting the external pressure to the inside of the cutter 3. The chamber 2 communicates across a passage 4 with the inside of the bit above the opening 5 wherein the nozzle 6 is mounted. The pressure resulting from the mud weight in the drill-pipes along with the differential pressure of the downward stream is transmitted through passage 4 to the resilient mechanism in chamber 2. The chamber 2 communicates through a channel 7 with the circular lubricating passage 8, provided around the ball retaining plug 9, which closes the opening serving for introducing the balls 10, to the inside of the cutter 3, and which is usually held in place by a weld 11.

From passage 8 there branches off the lubricating channel 12 which is provided in the upper part of pin 13 of leg 1. Considering the position of the bit in its working position where the cutting operation takes place, primarily at the bottom, it will be noted that the highest stresses occur in the lower portion of the pin.

The lubricating channel 12 leads the lubricant to the big cylindrical roller bearing 14, i.e. to the space 15 limited by the inner surface of the annular seal 16, providing a seal between the lubricant and the drilling fluid.

From the passage 8 there branches off: another lubricant channel 17 extending in the plug 9 which communicates with the ball-bearing 10. The lubricating channel 18 communicating with the circular passage 8 extends along the axis of the pin 13.

The passage 18 conducts the lubricant to the top of the pin 13, i.e. the nose of the cutter 3, and the passage 19 conducts the lubricant to the small cylindrical roller bearing 20 or to the friction bearing.

An opening 21 in the wall of the cutter near the nose, serves to let off the air while the lubricant is introduced into the cutter to the bearings. The opening 21 is provided with a fine thread and is closed by means of a brass threaded plug. The inner end of opening 21 has a smaller diameter, so that the brass plug can be caulked in place with a hammer after it has been screwed in. The brass plug must afford a tight seal, safe from breaking off, because of the damaging vibrations occurring during the drilling operations. The chamber 2 contains a tubular part 22, secured in the leg shoulder by a retaining ring 23 and sealed on the leg body by means of a rubber seal ring 24 of the O ring type. The tubular part 22 extends at one end into a lubricating pipe 25 which is enlarged at the top to form a recess 26 which holds a lubricator consisting of the ball 27, the spring 28 and the ball stop 29 with a circular opening having a mating surface fitting exactly to that of the ball surface. The top cross-section of the opening of the stop 29 is square, so that the stop can be screwed into the tubular part 22 by means of a square wrench.

Between the parts 22 and 29 there is provided a seal ring of rectangular cross-section 30.

Figure 1:
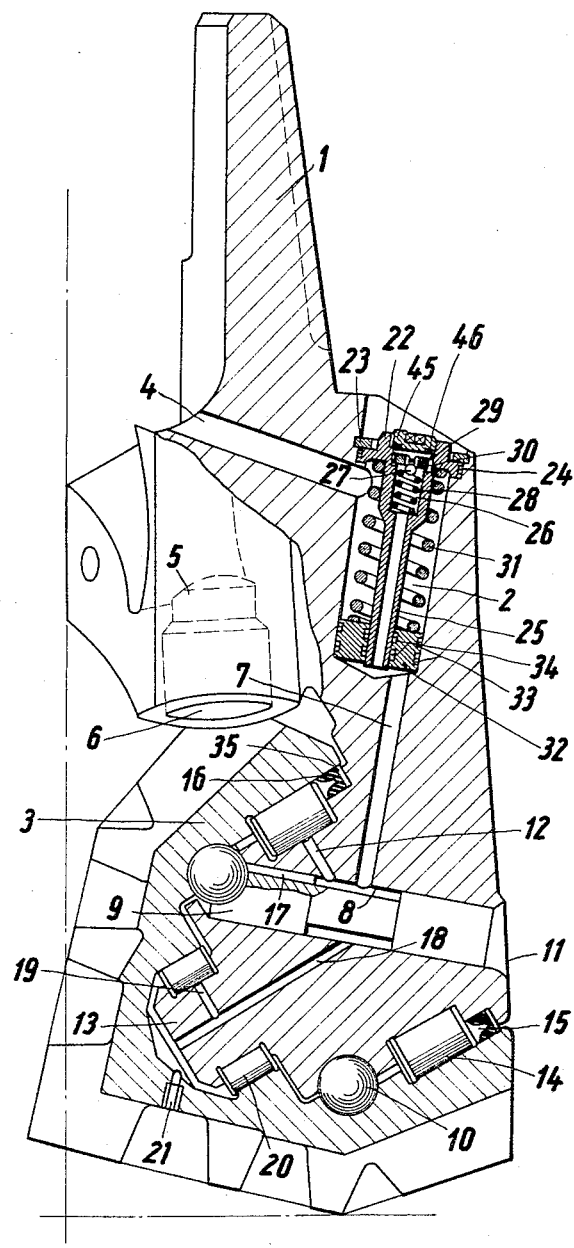
FIG. 1 is a sectional view through the leg of a rock bit, showing the bearing sealing device before the lubricant is pressed into the bearing.

A special spring 31 is mounted on the outside of the tubular part 22. One end of this spring presses down against a piston 32. Two rubber O-rings 33 provide a seal between the piston 32 and the walls of the lubricant chamber 2, and two O-rings 34 provide a seal between the piston 32 and the outer surface of the pipe 25. The other end of the spring 31 presses against the part 22 from below as shown in FIG. 1.

Figure 2:
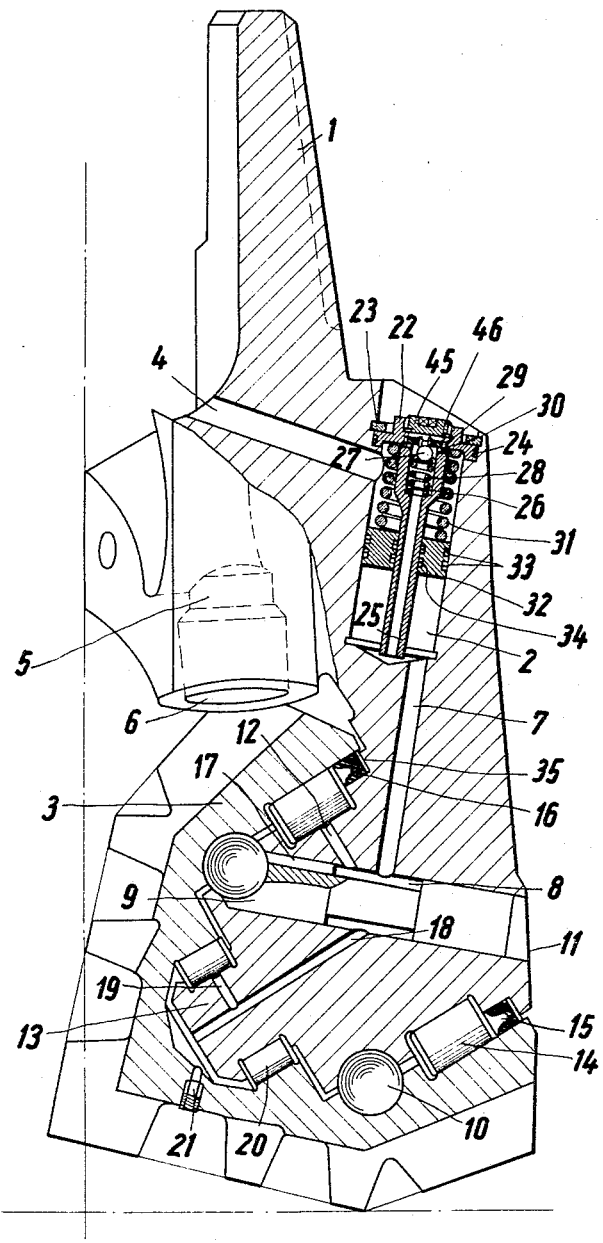
FIG. 2 is a sectional view through the leg of a rock bit showing the bearing sealing device subsequent to pressing of the lubricant into the bearing.
Figure 3:
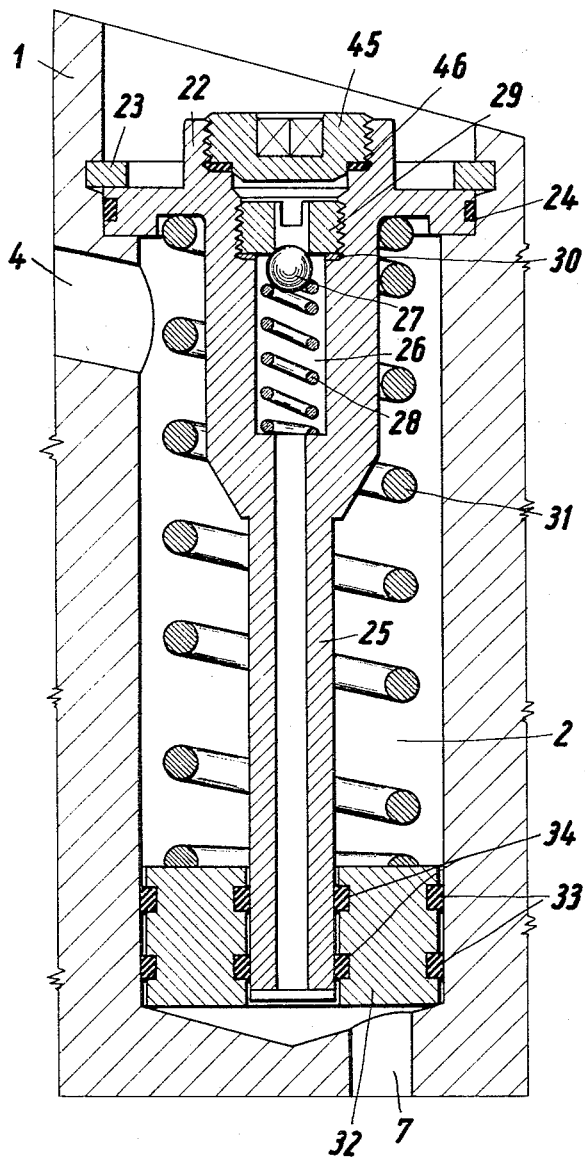
FIG. 3 is a sectional view through a resilient mechanism and the lubricant chamber, the spring being uncompressed before pressing the lubricant into the bearing.
Figure 4:
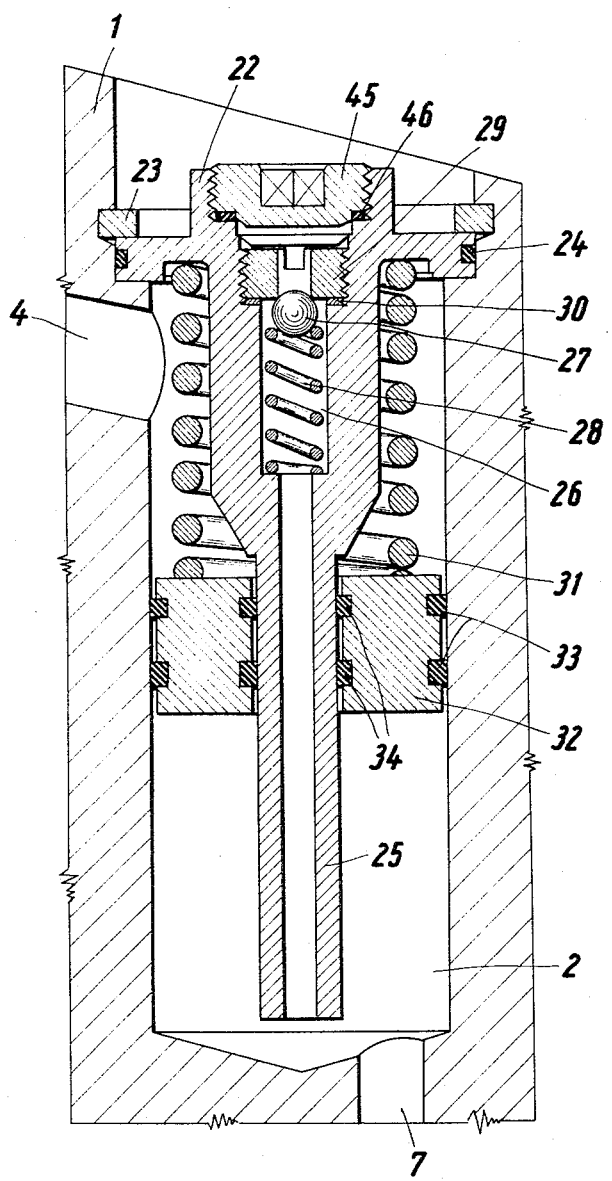
FIG. 4 is a sectional view through a resilient mechanism and the lubricant chamber with the spring kept in compression after pressing the lubricant into the bearing.

The piston 32 acts as a seal between the lubricant and the drilling fluid which enters the chamber 2 across the passageway 4. The spring 31 presses against the piston with a force of about 1 kg./cm.$^2$ even when it is not held in compression, when the piston is in its lowest position, as shown in FIGS. 1 and 3. While the spring is fully compressed the piston 32 is almost in its uppermost position in the lubricant chamber 2, as shown in FIGS. 2 and 4. In this position, nearly all the force of the spring is exerted upon the piston, pushing it downward, and thus the initial lubricant pressure of 3–5 kg./cm$^2$ arises after the lubricant has been introduced into the cutter. The spring 31 is so sized as to give an initial lubricant pressure of about 5 atm. inside the cutter, while the spring is almost fully compressed. As described above, the O-rings 33 and 34 seal completely the piston against the pipe 25 and the walls of chamber 2 while the piston moves up or down, or is in an intermediate position. The annular seal 16 of U cross-section is placed between the cutter 3 and the pin 13, at the edge of the cone backface and the lower end of the pin, under the shirt tail of leg 1, i.e. under the roller bearings.

The annular seal 16 is the most important part of the device. Special care must be taken for its construction in order that a perfect seal is ensured between the cutter and pin. It must provide a seal for the lubricant located under elastic pressure conditions inside the cutter, against the drilling fluid on the outside of the cutter, both during working time of the bit and when drilling is discontinued.

The U-type annular seal 16 may be made of resilient rubber whose bottom surface is made rigid by means of a brass ring 35 to which it is vulcanized so that it can maintain its shape while the bit is working. This brass ring increases the strength of the annular seal at its lower part so that it can resist high inner pressures without bursting. The inside diameter of the annular seal 16 is somewhat less than the outside diameter of the pin at the point where the annular seal is placed, in order that it can fit tightly against the pin.

Figure 5:
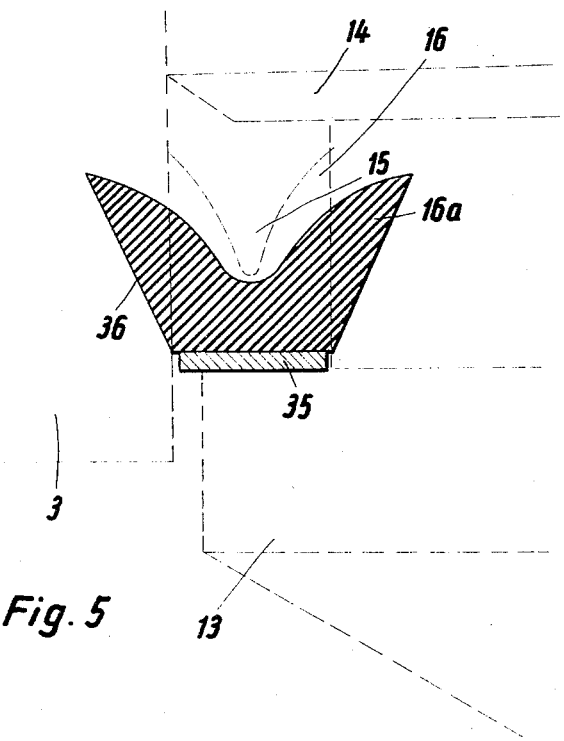
FIG. 5 is a cross-section through a U-shaped rubber annular seal prior to its mounting. The shape the annular seal assumes when secured in place is shown by dotted lines.
Figure 6:
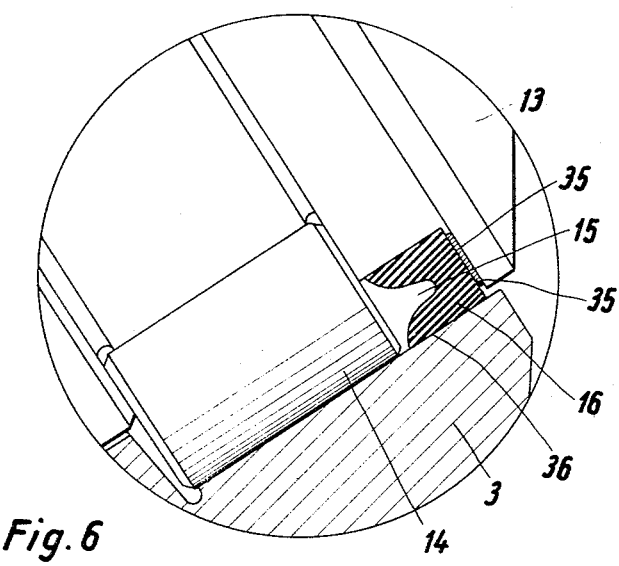
FIG. 6 is a position of the rubber U-shaped annular ring secured between the metal surfaces of cutter and pin.

FIG. 5 shows the cross-section 16a of the annular seal before mounting, as it is pulled out of the mould. When positioned between the metal walls of the cutter and the pin, the annular seal shrinks and its cross-section changes its shape as shown in FIG. 5 by the dotted line 16. To permit self-lubrication and reduce friction, the outer side surfaces of the annular seal are coated with a thin graphite rubber layer 36. The positioning of the annular seal 16 between the cutter 3 and pin 13 just under the shirt tail of the leg 1 is shown in FIG. 6. As an alternate type to the annular seal 16a, a composite annular seal 37a, 38a can be used, with an annular metal wall vulcanized on the rubber wall of the annular seal. FIG. 7 shows a cross-section of the aforementioned composite annular seal with the outside metal wall 37a made of a corrugated sheet whose size is such as to resist wear and to be sufficiently resilient to permit uniform deformation under the pressures present inside the cutter.

When secured in place, the annular seal 37, 38 shrinks as is shown by the dotted line in FIG. 7, pressing thus against the cutter and pin walls. FIG. 8 shows the way the composite annular seal 37, 38 is positioned between the walls of cutter 3 and pin 13.

To ensure the seal between the cutter and the annular seal the cutter 3 is fitted with a rubber ring 39 vulcanized on its contact faces with the cutter. The ring 39 may also be made as an antifriction alloy cast directly in place. The lubricating passage 40 which is formed by the corrugated metal wall 37a of the annular seal is shown in FIGS. 7 and 8. These grooves reduce the friction surface between the metal ring and the rubber ring vulcanized on the cutter wall. On the other hand the grooves, being initially filled with a lubricant, will help lubricate the surfaces in relative motion with respect to each other and reduce friction.

The sealing action of the two annular seal types 16a and 37a, 38a differs in that with the annular seal 16a the metal surface of the cutter moves, while the rubber surface of the annular seal remains fixed, whereas with the composite annular seal 37a, 38a the rubber surface of the ring which is vulcanized inside the cutter is moving and contacts the fixed metal surface of the annular seal. For an effective seal to be obtained in this case, the annular seal should be secured so that it can not turn but remain fixed on the pin while the cutter is rotating.

The bellows type composite annular seal, due to its reduced friction surface, may be used in bits where the differential pressure created inside the cutter is relatively high.

Another construction of the composite annular seal is shown in FIGS. 9 and 11 where the metal wall 41a is vulcanized on the rubber wall 42a. Since the metal wall of this annular seal is plane rather than corrugated, the surface contacting the rubber ring 39 vulcanized inside the cutter is larger. The cross-section of the annular seal 41, 42 with its wall pressed between the two rotating surfaces is shown by the dotted lines. The annular seal being forced into place tends to resume its initial shape 41a, 42a, thereby expanding tightly against the two surfaces and providing a seal which is complemented by the lubricant pressure exerted from the inside.

The circumference of the walls 37 and 41 of both annular seal types is discontinuous so that their diameters are variable. Both ends 43, FIG. 10, are bent and vulcanized on a resilient rubber connection 44, whose length must be as small as possible in order to minimize the rubber on rubber friction. Regardless of the shape and material of the annular seal, it must be completely protected against the considerable stresses exerted upon cutter and pin during the drilling operations. Also, the annular seal should be protected by the shirt tail of the leg. In order for the shirt tail to be safe from breaking and chipping, it should be protected against carburization and then hardfacing should be applied on its entire surface up to the weld on the top of the ball retaining plug.

The resilient mechanism is protected by the plug 45 which is screwed into the tubular part 22, the seal being provided by the seal ring 46 of rectangular cross-section. Mounting, lubricant filling and operating principle of the bearing sealing device for rock bits, presented in this invention, is described in the following:

The annular seal 16, or one of the composite annular seals 37, 38 or 41, 42 is positioned into the bore on the pin 13 in their unexpanded form, so that they can enter completely the space provided for this purpose below the big rollers 14 whose length has been reduced. Then the usual procedure for assembling rock bits is applied:

The small rollers 20 and the big rollers 14 are secured on the pin 13;

The balls 10 are introduced through the ball loading hole;

The ball passage is then closed with the ball retaining plug 9;

The plug 9 will be welded at its outer end, care being taken that the welding heat does not damage the annular seal placed nearby. Examining FIG. 3 it can be noted that a number of separated parts, form an assembly which is called "the resilient mechanism" of the device, and which is mounted around and inside the tubular part 22, which will be described later.

The piston 32 is positioned on the pipe 25 deforming somewhat the rubber O rings 34, which will thus retain the piston in the pipe. The resilient mechanism of the device is a unit which can be assembled separately. It can be thus introduced as a single unit into the lubricant chamber 2, after the O ring 24 serving to seal the resilient mechanism has been positioned in the tubular part 22. For this purpose the seal ring 24 is pressed on the tubular part 22 by means of a retaining ring 23, placed in a recess in the shoulder of the leg 1. The size of the O ring 24 must be such as to provide a perfect seal between the resilient mechanism and the leg 1, preventing leakage from the down flowing mud stream in the drill-pipes and bit to the up flowing mud stream in the bore-hole, through the passageway 4.

In the lower position of the piston 32, i.e. when the piston is at the bottom of the pipe 25 as shown in FIGS. 1 and 3, the spring 31 which is almost completely released must, however exert against the piston 32 a pressure of about 1 kg./cm.$^2$.

The resilient mechanism of the device presented in this invention can be mounted in the bit leg quite easily in a few minutes.

After the device is secured in place as described, the lubricant should be introduced into the cutter as follows:

The plug 45 will be unscrewed with a square wrench. The pipe of the pressure lubricating pump (not illustrated) fitted with a pressure gauge is secured in the lubricating passage of part 29. The lubricant should then be introduced into the inner part of the device, the bit being placed with its shank downwards in order to facilitate air removal through opening 21 in the nose of the cutter. The lubricant enters the chamber 26 bypassing the ball lubricator 27, then passes into pipe 25 filling the pocket of the chamber 2 in front of the piston 32 and hence into the passage 7. On reaching the circular space 8 around the plug 9 the lubricant is distributed across the passage 12 to the big roller bearing 14 and to the space 15 limited by the inner area of the U type annular seal 16. The lubricant is conducted across the passageway 17 to the ball bearing 10, and across passageways 18 and 19 it reaches the small roller bearing 20 in the nose of the cutter, where it fills all the free space in the cutter and finally it is pressed out through the opening 21 in the nose of the cutter.

The complete removal of the air existing inside the cutter is of particular importance. For this purpose, pumping of the lubricant is continued slowly, at low pressure so that the air around the bearings might be completely removed. When there are no more air bubbles in the lubricant coming out through the opening 21, the pump will be stopped but without disconnecting it from the opening 29. FIG. 2 shows the procedure when pumping of the lubricant is continued.

A brass screw having at its top a slot will be caulked into the opening 21, closing the opening 21 permanently. Pumping of the lubricant is then continued under pressure.

The lubricant pushes the piston 32 upwardly thus gradually compressing the spring 31. The piston rises almost to its uppermost position, as shown in FIGS. 2 and 4, and chamber 2 fills with the reserve lubricant. The size of the spring should be such that when it is completely under compression the lubricant pressure inside the cutter should be about 5 kg./cm.$^2$, above or under this value depending upon the operator's experience.

In this way, the initial lubricant pressure will be exerted according to Pascal's law, upon all the inside surfaces including the inside area of the annular seal 16, which encloses the space 15 filled with the lubricant. The walls of the annular seal 16 tend to expand, pressing more tightly on the metal surfaces of the cutter 3 and pin 13 than due only to the tendency of resuming its initial form. A perfect seal is thus obtained between the lubricant inside the cutter and the drilling fluid in the hole. In this case the piston 32 reaches a condition of equilibrium, the spring 31 providing a back pressure of about 5 kg./cm.$^2$ exerted upon the piston, called $P_0$. This pressure is transmitted by the lubricant to the U type annular seal 16. The latter presses at the same time upon the metal walls of the cutter 3 and pin 13, with its own pressure, $p$, arising from the internal tension in the rubber body when the annular seal 16 is forced into its bore by changing the shape of its cross-section.

Thus, if $P_g$ is the pressure exerted by the annular seal upon the metal walls after introducing the lubricant:

$$P_g = p + P_0$$

To safely close the device, the plug 45 will be screwed into the top of part 22 after positioning the seal ring 46 in its bore.

After mounting in each of the three legs (only one leg being illustrated) of the bit one sealing device according to the invention, the bit is ready to start to work.

The pressure exerted upon the bit increases with depth due to the specific weight of the drilling fluid.

The drilling fluid of the same specific weight filling the drill-pipes will flow through the bit and the bit nozzles to the outside of the bit between the drill-pipes and the walls of the bore-hole. At the same time the drilling fluid will pass across the passageway 4 into chamber 2 above piston 32, where the spring 31 is mounted.

In order to avoid plugging of the passageway 4 and the upper part of chamber 2 containing the spring 31 with cuttings, there is provided at the mud inlet of passage 4 a suitable fine sieve. A very resilient rubber membrane would be however more desirable, as in this case the free space inside the passage 4 and chamber 2 could be completely filled with glycerine.

The mud pressure in the drill-pipes displaces the piston 32 downwardly a small distance as the lubricant has very little compressibility and the air has been completely removed from the inside of the cutter. The outside pressure is transmitted by means of the resilient mechanism immediately to the lubricant inside the cutter. The pressure of the outside fluid will tend to equal the lubricant pressure inside the cutter, but the latter will remain throughout the drilling operations at a higher value.

Thus, at the time the bit reaches the bottom the mud pressure in the drill-pipes, i.e. the pressure inside the passage 4, is the same as the pressure outside the bit. This is equal to the weight of the mud column in the bore-hole:

$$P_n = \tfrac{1}{10} H \gamma$$

where:
$P_n$=mud column pressure at the bottom, kg./cm.$^2$
$H$=height of the mud column, $m$
$\gamma$=specific weight of the mud, kg./dm.$^3$ As described in the foregoing, the pressure $P_n$ is also exerted upon the resilient mechanism of the bearing sealing device and is transmitted by means of the lubricant in the cutter, outwardly to the U type annular seal 16.

The pressure $P_g$ exerted by the annular seal upon the metal walls when the bit is on the bottom, would thus seem to be:

$$P_g = p + P_0 + P_n$$

However, the pressure $P_n$ is exerted upon the annular seal 16 inwardly as well, and the pressure $P_g$ will actually be $$P_g = p + P_0 + P_n - P_n = p + P_0$$

The downward displacement of piston 32 is therefore very small and is due only to the compression of the lubricant.

It must be noted that the rubber mass of the annular seal is compressed from the inside of the cutter with the pressure:

$$P = p + P_0 + P_n$$

and the inside lubricant pressure $P_1$ will be:

$$P_1 = P_0 + P_n$$

After the mud circulation has started and the bit works on the bottom or stands still while the circulation goes on, a differential pressure arises between the downward flowing mud stream in the pipes and the bit above the nozzles and the upward flowing mud stream in the well-bore, i.e. on the outside of the pipes, which approximately is equal to the pressure drop across the bit nozzles. The latter is called the differential pressure of the mud stream on the bottom, denoted by $P_d$.

This pressure is exerted across the passageway 4 upon the piston 32 which is displaced downwardly a distance proportional to $P_d$ and compresses the lubricant inside the cutter until the pressures are equalized and the piston reaches equilibrium.

In this case, the pressure $P_g$ exerted outwardly by the annular seal will be:

$$P_g = p + P_0 + P_d$$

The pressure P compressing the annular seal—i.e. the rubber mass—is $$P = p + P_0 + P_d + P_n$$

The lubricant pressure:

$$P_I = P_0 + P_n + P_d$$

The differential pressure $P_d$ being equal to the pressure drop across the bit varies proportionally to the specific weight of the drilling mud and the squared velocity of the jet on leaving the nozzle, i.e. the squared mud flow rate, and inversely proportional to the squared flow cross-section of the bit.

The formula for the pressure drop across the bit is:

$$P_d = \alpha \gamma v^2 = \alpha \gamma \left( \frac{4Q}{n \pi D^2} \right)^2$$

where:
$\alpha$=experimental coefficient for fluid flow across nozzles of elliptic profile, approximately=

$$\frac{0.0051}{0.992} = 0.0052$$

$\gamma$=specific weight of the mud, kg./dm.$^3$
$Q$=mud flowing rate, dm.$^3$/sec.
$n$=number of nozzles (3)
$D$=nozzle diameter, mm.
$V$=velocity of jet on leaving the nozzles, m./sec.

Thus, the pressure drop across the bit, i.e. the differential pressure is independent of the depth at which the bit is working.

The differential pressure varies with the specific weight of the mud for the same flowing rate and flow cross-section in the bit, the nozzles having the same geometrical profile.

Therefore, the greater the specific weight of the mud the higher will be the pressure $P_g$, and the safer will be the seal provided by the U-shaped annular seal 16 or the composite U-shaped annular seals 37, 38 and 41, 42.

From the foregoing it is also apparent that during mud circulation, the fluid flow cross-section of the bit being the same, the higher the mud circulation rate the greater the sealing capacity of the U-shaped annular seal.

Furthermore, at the same circulation rate, the smaller the nozzle diameter the more effective will be the sealing action of the U-shaped annular seal. In both cases the differential pressure $P_d$ rises appreciably and therewith the pressure $P_g$ exerted by the U-shaped annular seal against the metal walls, providing thus an effective seal for the lubricant.

In order to illustrate the favorable influence of $P_d$ upon the operation of the bearing seal described in this invention, the value of the differential pressure $P_d$, i.e. the pressure drop across the three cone rock bits is given below as a function of several mud circulation rates and more frequently used nozzle diameters for a mud specific weight of 1.20 kg./dm.$^3$.

| Circ. rate, l./sec. | Nozzle diameter in mm. | | | | | | | |
|---|---|---|---|---|---|---|---|---|
| | 9 | 11 | 13 | 15 | 17 | 19 | 21 | 25 |
| 10 | 17.52 | 7.72 | 4.00 | 2.23 | 1.36 | 0.87 | 0.57 | 0.29 |
| 15 | 39.40 | 17.20 | 8.92 | 5.02 | 3.05 | 1.95 | 1.29 | 0.65 |
| 20 | 69.50 | 30.50 | 16.00 | 8.90 | 5.42 | 3.45 | 2.32 | 1.14 |
| 25 | 108.50 | 48.20 | 25.00 | 14.00 | 8.50 | 5.42 | 3.63 | 1.73 |
| 30 | 157.50 | 68.50 | 35.70 | 20.00 | 12.10 | 7.78 | 5.18 | 2.59 |
| 35 | 214.00 | 93.50 | 48.40 | 27.40 | 16.60 | 10.60 | 7.10 | 3.40 |
| 40 | 281.00 | 124.00 | 63.70 | 35.00 | 21.70 | 13.80 | 9.24 | 4.55 |
| 45 | 352.00 | 156.00 | 81.20 | 45.40 | 27.50 | 17.60 | 11.70 | 5.84 |
| 50 | 435.00 | 191.00 | 100.50 | 55.50 | 34.80 | 21.60 | 14.40 | 7.18 |

It is evident from these values that $P_d$ increases rapidly with the increase of the circulation rate.

The numerical values in the table are given in order to show definitely the positive influence of the differential pressure $P_d$, i.e. the pressure drop across the bit, acting inside the space 15 of the U-type annular seal upon the effective operation of the sealing device presented by this invention.

A particular example will show better the importance of the pressure problem, establishing the numerical values of the pressures both inside the cutter and outside it on the bottom of the well.

The case will be considered where the rotary drilling operations are performed with a 3 cone rock bit, in a well having the bottom at a depth of 2000 m., using a drilling fluid with a specific weight of 1.2 kg./dm.$^3$, at a circulation rate of 40 l./sec. and 3 nozzles of 15 mm. in diameter.

The initial lubricant pressure $P_0=5$ kg./cm.$^2$.

The differential pressure from the above table, $P_d=35$ kg./cm.$^2$.

The pressure $P_g$ exerted by the U-type annular seal upon the metal walls of the cutter and pin.

$$P_g = p + P_0 + P_d = p + 5 + 35 = p + 40 \text{ kg./cm.}^2$$

It must be noted that in the turbodrill where approximately 35% of the 40 l./sec. circulation rate is lost across the turbine nipple, a rate of only 26 l./sec. is left, and according to the above table $P_d=15$ kg./cm.$^2$, that means $$P_g = p + 5 + 15 = p + 20 \text{ kg./cm.}^2$$

In the case of the more recently developed turbines with nipple losses of less than 5%, $P_d$ is considered to have the same value as for the rotary system.

The drilling mud pressure on the bottom, due to the weight of the mud column is:

$$P_n = \tfrac{1}{10} H\gamma = \tfrac{1}{10}\, 2000 \times 1.2 = 240 \text{ kg./cm.}^2$$

The pressure P compressing the U-type annular seal mass will be:

$$P = p + P_0 + P_d + p_n = p + 5 + 35 + 240 = p + 280 \text{ kg./cm.}^2$$

The lubricant pressure $P_1$ inside the cutter:

$$P_1 = P_0 + P_d + P_n = 280 \text{ kg./cm.}^2$$

Several important observations are apparent from the foregoing:

The pressure $P_g$ exerted by the U-type annular seal upon the metal walls of the cutter is equal to the deformation pressure $p$ of the seal ring cross-section to which about 40 atm. are added in the case of rotary drilling and 20 atm. in the case of turbo-drill. Thus, due to the $P_d$ contribution, the pressure $P_g$ increases during the drilling fluid circulation and the sealing ability of the U-type annular seal is thereby increased.

The material from which the annular seal is made—the mass of the rubber—is compressed by a pressure $P=280$ atm. plus the initial deformation pressure $p$. It is to be noted that the annular seal rubber mass should resist a compression pressure of 300–400 atm. and even more, without sensible volume reduction and changing of its resilient properties. Also, the rubber annular seal should withstand a bursting pressure of 40–60 atm., i.e. it must have a high tearing resistance.

As the annular seal contacts the lubricant a fairly long time, 4 to 60 hours and even more, the physical and chemical properties of the material used—the special rubber—must not change in the presence of the lubricant, i.e. it must resist softening, dissolving, corrosion, etc.

Since, because of lack of space, the U-type annular seal has relatively small cross-section dimensions, 8 x 8 mm. up to 12 x 12 mm., its material should have high friction and wear resistance. For this purpose, in addition to the reinforcement with fine metal, nylon, silk or cotton fabric, it must contain silicon, i.e. be of the special silicon rubber type, or another special material.

It is interesting to note for instance that at the depth of 3000 m. the formation temperature may reach 100° C. and because of the bit friction on the bottom and the friction of the annular seal against the moving metal surfaces, the environment of the annular seal is a hot one. The rubber should therefore contain fluorine additives in order to resist temperatures up to approximately 150° C., although this temperature may not be reached due to the cold mud flowing across the bit.

The outer cover of the annular seal should be graphited in order to reduce friction and ensure self-lubrication.

The lubricant pressure $P_1$ inside the cone and inside the sealing device reaches in the present example 280 atm. For other wells it may be as high as 300–400 atm. and even more. The ambient temperature may reach 100°–120° C. It is thus necessary to use a specially treated lubricant for extreme pressures and high temperatures, so that its lubricating characteristics can be maintained under severe operating conditions.

The pressure $P_n$ exerted by the mud column upon the bottom amounts to 240 atm., i.e. it is 40 atm. less than the lubricant pressure $P_1$ inside the cutter. Thus, the U-type annular seal will be submitted to a pressure difference equal to $$P_1 - P_n = 40 \text{ atm.}$$

The pressure $P_g$ compressing the annular seal against the metal surfaces of the cutter and pin will have an effective action only as long as the annular seal is undamaged. After some time, the annular seal begins to wear and the pressure $p$ arising from the internal tension of the rubber decreases continuously until it becomes zero. The cross-section of the annular seal is reduced to the extent that it is no longer compressed by deformation.

At the same time, the lubricant pressure $P_0$ maintained by the spring 31 to which the differential pressure $P_d$ has been added, will decrease and the lubricant will fill the space resulting from the annular seal wear progressing from outside.

Now the axial and radial clearances between the cutter and its pin enlarge, resulting in the increase of the space 15 of the annular seal. In this way a portion of the lubricant available in chamber 2 will move to the inside of the cutter. The piston 32 will travel slowly downward and the compression of spring 31 decreases gradually. As the annular seal wear advances, lubricant leakage to the outside will occur and the compression upon the spring 31 decreases further. The piston 32 travels down until the compression upon the spring 31 is almost completely released. Meanwhile the reserve lubricant in chamber 2 flows over to the bearings ensuring their lubrication until the piston 32 reaches its lowest position. At this moment $P_0$ becomes zero. Thus the relation $$P_g = p + P_0 + P_d$$

where $p$ and $P_0$ are zero, becomes $$P_g = P_d$$

As the lubricant leakage around the annular seal increases, $P_d$ which is still exerted from the inside upon the annular seal diminishes rapidly until it is completely nullified and the piston 32 after accomplishing its downstroke becomes a plug providing a seal against the down flowing mud pressure. Now, since $P_d$ is zero $$P_g = 0$$

and the resilient mechanism of the device is put out of action.

The lubricant pressure inside the cutter $$P_1 = P_0 + P_d + P_n$$

now becomes $P_1 = P_n$ since $P_0 = 0$ and $P_d = 0$.

The lubricant pressure $P_n$ becomes equal to the pressure of the drilling fluid on the bottom. Since the annular seal is no longer able to provide effective sealing, the drilling fluid which is in a condition of high turbulence around the bit, will shortly replace the lubricant in the cutter, and bearing wear occurs as if the bit had no sealing device. However, there is no need to pull out the bit because the roller bearings were so far continuously lubricated and wear on the bearing elements is in fact very small. The time elapsed since the bit starts working until the bearing sealing device ceases operation should always exceed the time interval until the bit teeth are completely dulled. In this case, on pulling out the bit some lubricant is still found in the bearings. If on the contrary, the effective sealing life of the device is shorter than the time interval for the bit teeth to be worn out, when pulling the bit the bearings will be filled with drilling fluid. In both cases the bit life will be considerably longer than that of conventional bits of the same type which are not fitted with the bearing sealing device.

Since the differential pressure $P_d$ occurs only during mud circulation, it becomes zero as soon as circulation is stopped. The lubricant pressure during mud circulation is $$P_1 = P_0 + P_n + P_d$$

and when mud circulation is stopped it becomes $$P_1 = P_0 + P_n$$

Since in both cases $P_0$ and $P_d$ are positive factors $$P_1 > P_n$$

i.e. the U-shaped annular seal is pressed outwardly at all times providing thus effective sealing. When after some time due to the annular seal wear, lubricant leakage begins until the whole reserve lubricant in chamber 2 is used up, the lubricant pressure inside the cutter remains higher than the drilling fluid pressure in the bore-hole.

It is thus obvious that an initial lubricant pressure $P_0$ inside the cutter is required and this pressure must be exerted elastically against the bearing elements inside the cutter. As the cutter wears out during the drilling operations, the axial and radial clearances between cutter and pin are enlarged and the annular seal walls adhere continuously to the rotating surfaces due to the permanent pressure $P_0$ to which the differential pressure $P_d$ is added during mud circulation. These two pressures are exerted elastically by means of the resilient mechanism of the sealing device. The piston 32 moves up and down supplying the lubricant between chamber 2 and the inside of the cutter. The slush pumps happen sometimes to stop suddenly while the bit is working on the bottom. The drilling operations are continued a short time until the driller becomes aware of this fact.

In this case $P_d$ becomes zero, and only $P_0$ will be exerted from the inside upon the annular seal. Even when the mud circulation is stopped by the driller himself, and the bit is brought to a standstill above the bottom, the lubricant pressure inside the cutter is $P_1 = P_0 + P_n > P_n$, and thus the annular seal compressed from the inside still provides an effective seal since the lubricant pressure inside the cutter is higher than the mud pressure in the bore-hole.

Considering the phenomena occurring when mud circulation is stopped in order to add another joint to the drill string, frequently in raising the kelly the mud will overflow the tool-joint box at the top of the drill pipes engaged in the slips in the rotary table. This phenomenon is due to the mud column weight in the bore-hole being greater than the mud weight in the drill pipes, as the mud in the bore-hole contains a big amount of solids resulting from the rock fragments dislodged by the bit, which increases the specific weight of the mud. Thus, a short time, until equilibrium is established between the two mud columns, the mud pressure at the bottom, $P_{ne}$, is higher than the mud pressure in the drill-pipes $P_{ni}$. The lubricant pressure during the drilling operations is known to be $$P_1 = P_0 + P_d + P_n$$

If the annular seal were worn out so that $p$ becomes null or almost so, and the lubricant were not introduced into the cutter under an initial pressure, i.e. if $P_0$ did not exist:

$$P_1 = P_{ni}$$

as $P_0 = 0$ and $P_d = 0$, due to the mud circulation being stopped.

But as $P_{ne} > P_{ni}$, the lubricant pressure will be lower than the bore-hole mud pressure, i.e.

$$P_1 < P_{ne}$$

The drilling mud may enter the cutter if the U-shaped annular seal is worn to the extent that the initial deformation pressure $p$ of the annular seal cross-section is overcome by the pressure difference available on the bottom, when $$p < P_{ne} - P_{ni}$$

In this case the sealing action fails as soon as mud circulation is stopped.

To avoid this, an initial lubricant pressure $P_0$ must exist inside the cutter, which will be exerted against the annular seal by the resilient mechanism.

From the foregoing it is obvious that the sealing device requires the spring 31 acting continuously upon the piston 32 so that the relation $$p + P_0 > P_{ne} - P_{ni}$$

can be satisfied.

In this case the U-type annular seal will be able to provide effective sealing while the mud circulation is stopped and the bit stands on bottom. Field test will show the value of $P_0$ which should be chosen so as to maintain the inequality $$P_0 > P_{ne} - P_{ni}$$

even when $p$ becomes zero.

In the present invention a pressure of 3–5 atm. has been indicated for $P_0$, but these values can be changed upward or downward.

An important requisite, in applying the sealing device according to the invention, is that the air inside the cutter should be completely removed as the lubricant is pressed in. In case some air remains in the cutter, this air will assume the initial lubricant pressure, i.e.

$$P_a = P_1 = P_0 = 5 \text{ atm.}$$

For instance, in drilling at the depth of 2000 meters using a drilling fluid whose specific weight is 1.2 kg./dm.$^3$, a circulation rate of 40 l./sec. and nozzles of 15 mm.

diameter, the lubricant pressure inside the cutter will be, as shown in the foregoing:

$$P_1 = P_0 + P_n + P_d = 5 + 240 + 35 = 280 \text{ atm.}$$

The available air volume being compressed from 5 to 280 atm. will be considerably reduced becoming $V_2$. According to the Boyle-Mariotte law, if:

$$P_0 V_1 = P_1 V_2 = K \text{ (constant)}$$

$V_2$ will be $$V_2 \frac{P_0}{P_1} V_1 = \frac{5}{280} V_1 = \frac{1}{56} V_1$$

When drilling at the depth of 2000 m., the air volume $V_2$ will therefore be 56 times smaller than that at the surface. The remainder 55 parts of $V_1$ will be occupied by a portion of the lubricant in chamber 2. If, by mistake, a larger amount of air is left in the cutter, the piston 32 may reach its lowest position during the compression process.

In this position the piston 32 acts as a plug against the differential pressure $P_d$ and consequently the latter cannot be transmitted to the lubricant. The sealing capacity of the U-type annular seal will thus be appreciably reduced. As the lubricant in chamber 2 is conducted gradually to the cutter from the beginning of the bit operation, very little lubricant, if any, will be left over for supplying the bearing in the case leakage around the annular seal will occur. To prevent this, it is suggested that in introducing the lubricant into the cutter care should be taken to completely remove the air. This is one of the reasons for which the device has been provided with a ball lubricator 27 for introducing the lubricant and with the opening 21 on the nose of the cutter for the air to be removed.

While the length of the big rollers at the lower part of the cutter has been reduced in order to obtain the space required for securing the annular seal, the life of the roller bearing may be doubled and sometimes even trebled as compared to that of the conventional rock bits of the same type which do not use the sealing device.

The stress distribution in the bearing elements of the bit equipped with the bearing seal according to the invention differs from that in the conventional bits. This stress distribution permits the life of the bearings to be increased in the bearing seal bits, as the loads upon the bearing elements are generally lower.

As a matter of fact, in the case of the bearings using the sealing device, the lubricant pressure inside the cutter is higher than the outside mud pressure, i.e. $P_1 > P_n$.

In the following the load distribution in the bearing elements will be presented in a highly simplified form.

The pressure difference $P_1 - P_n$ results in a force pushing the cutter toward the pin top. This force, F, is equal to the product of the surface S of the circular cross-section whose diameter equals the outside diameter of the annular when secured in place, and the pressure difference between lubricant and drilling fluid:

$$F = S(P_1 - P_n) = S(P_0 + P_d + P_n - P_n) = S(P_0 + P_d)$$

In the foregoing example the lubricant pressure is 40 atm. higher than the drilling fluid pressure. Applying the above relation to a bit of $9\frac{5}{8}''\phi R_{10} C_b \phi 244.5$ mm., the outside diameter of the annular seal being 85 mm., the area S upon which this pressure will be exerted is 56.75 cm.²

In this case the cutter will be forced toward the top of the pin by an axial force F:

$$F = 56.75 \text{ cm.}^2 \times 40 \text{ kgf./cm.} = 2270 \text{ kgf.}$$

If the weight on the bit is A, the weight exerted vertically upon one of the three cutters will be $A/3$. The rock force reacting to the cutter must be equal and of opposite sign. The axial component given by this reactive force acting longitudinally along the bearing pin is approximately:

$$R_a = \frac{A}{3} \cos \phi$$

where $\phi$ is the angle formed by the pin axis and the vertical bit axis. In the case of the bit $9\frac{5}{8}'' - R_{10} C_b \phi 244.5$ the pin angle to the bit axis $$\phi = 57°.30' (\cos \phi = \cos 57°30' = 0.537)$$

If the weight on the bit, A, is 10 tons (1 ton per inch of bit diameter)

$$R_a = \frac{10}{3} \times 03.57 = 1800 \text{ kg.f}$$

The axial load acting longitudinally along the bearing pin will be $$Q = R_a - F = 1800 - 2270 = -470 \text{ kgf.}$$

It is to be noted that in the foregoing case the axial load acting upon the ball bearing and indirectly upon the other elements of the bearing, is much lower (470 kgf. as compared with 1800 kgf.) and is directed towards the top of the pin. The direction of this axial load depends on the ratio of the bit load A to the force resulting from the pressure difference $P_1 - P_n$, for the same cross-section S. Inasmuch as the ball-bearing is subjected ot less stress, its operating life will be longer, independently of the fact that it works in a lubricating environment.

Thus, the axial clearance increase resulting from the ball bearing wear will be greatly delayed, eliminating the possibility of subjecting the cylindrical rollers to additional axial stress besides their normal radial stress, which tends to skew the rollers in the races owing to cutter displacement along its axis.

The differential pressure $P_d$ of the down flowing mud stream, transmitted by means of the bearing sealing device of the invention, may therefore improve appreciably the working conditions of the cutter bearings and may increase the bit footage twice and even more. This improvement results in considerable savings in the drilling costs.

Thus, the reduction of the length of the cylindrical roller bearing at the lower part of the pin, in order to obtain the necessary space for placing the annular seal, is possible without affecting the working conditions of the bearings, i.e. the life of the rock bit.

From the foregoing the highly effective double contribution of the differential pressure $P_d$, made possible by means of the bearing sealing device of the invention, is clearly apparent:

Owing to the pressure $P_d$ the sealing efficiency of the U-shaped annular seal is greatly increased during mud circulation, and consequently the working life of the bearings, which are permanently supplied with the lubricant effectively sealed against the drilling fluid from outside, is considerably prolonged.

The pressure $P_d$ reduces the stresses arising during the drilling operations in the bearing elements, increasing the bit life by creating an additional force tending to push the cutter towards the top of the pin, and acting in an opposite direction to the load resulting from the bit weight exerted on the bottom.

One of the most important advantages of the bearing sealing device of the invention consists in improving the rock bit performance with respect to bit footage, which is considerably increased compared to that obtained with bits which do not use the bearing seal. This means a direct contribution to the reduction of the bit number being used.

The round trip number will be reduced to the same extent, which in the case of the deep bore-holes require considerable time and their cost exceeds by far the bit cost.

Finally, the drilling time will be also reduced and consequently the drilling operation cost will be appreciably cut down.

Another advantage is the almost complete elimination of the danger of bit failure caused by the cutter getting stuck and breaking, inasmuch as the bit will be pulled out when the teeth are dulled, which happens before the bearings are worn to the extent that they can provoke cutter sticking and consequently their breaking.

It is thus obvious that bit failure is less likely to occur when the bit is equipped with the sealing device of the invention.

As a matter of fact, the device of the invention may be considered, in addition to the function mentioned above, as a safety device preventing bit failure. It can be used advantageously in all rock bit types, from the milled tooth bits for very soft rocks to carbide bits used for drilling extremely hard and abrasive rocks. The bearing sealing device can be used in bits beginning from a minimum 7½″ to larger sizes.

Although the invention has been illustrated and described with reference to several preferred embodiments thereof, it is to be understood that it is in no way limited to the details of such embodiments but is capable of numerous modifications within the scope of the appended claims.

What I claim is:

1. In a drilling assembly, a bit body adapted to be attached to a drill pipe string, said body having a cutter-supporting pin, and a rotary cutter carried by said pin for rotation with respect thereto, said pin and cutter defining between themselves a space in which lubricant is adapted to be situated, and a sealing ring closing said space, said body being formed with an elongated lubricant-supply chamber and with passages providing communication between said chamber and the space between said pin and cutter, means carried by said body and communicating with said chamber for initially introducing lubricant into the latter and through said passages into the space between said pin and cutter under a predetermined initial pressure, a piston slidable in said chamber and a spring acting on said piston for maintaining the pressure of the lubricant in said space, and said body being formed with a bore communicating with one side of said piston and with the interior of the drill pipe string for providing communication between said one side of said piston and the differential pressure of the drilling mud in the drill pipe string, whereby the lubricant pressure in said space is maintained higher than the pressure outside of the drill.

2. The combination of claim 1 and wherein said sealing ring includes an annular sealing member of U-shaped cross section having a metal ring vulcanized to one face thereof with a pair of legs of the U-shaped cross section projecting from the metal ring and spread apart from each other against the sealing surfaces by the lubricant under pressure in said space.

3. The combination of claim 2 and wherein one of said legs of said U-shaped cross section is an outer leg which surrounds the other leg, and said outer leg being in the form of an annular metal strip vulcanized to the remainder of the sealing ring, said pin having an annular elastic body engaging said metal leg of said sealing ring.

4. The combination of claim 3 and wherein said metal leg has a straight cross section.

5. The combination of claim 3 and wherein said metal leg has a wavy cross section.

References Cited by the Examiner

UNITED STATES PATENTS

| | | | |
|---|---|---|---|
| 16,796 | 3/1897 | Henwood | 184—41 |
| 1,238,757 | 9/1917 | Gardner | 175—227 |
| 1,909,078 | 5/1933 | Scott | 175—228 |
| 1,909,128 | 5/1933 | Scott | 308—8.2 |
| 2,174,102 | 9/1939 | Catland | 308—187 X |
| 2,668,068 | 2/1954 | Bredemeier | 277—96 X |
| 2,814,465 | 11/1957 | Green | 308—8.2 |
| 2,964,366 | 12/1960 | Reynolds | 277—205 X |
| 3,007,750 | 11/1961 | Cunningham | 175—228 X |
| 3,029,881 | 4/1962 | Swart | 175—228 |
| 3,048,230 | 8/1962 | Angel | 175—228 |
| 3,064,982 | 11/1962 | Stephens | 277—96 X |
| 3,127,942 | 4/1964 | Neilson | 175—372 X |
| 3,151,691 | 10/1964 | Goodwin | 175—228 X |

FOREIGN PATENTS 227,268  12/1958  Australia.

CHARLES E. O'CONNELL, *Primary Examiner.*

DON A. WAITE, *Examiner.*

L. L. JOHNSON, N. C. BYERS, *Assistant Examiners.*